(12) United States Patent
Choi et al.

(10) Patent No.: US 6,678,034 B2
(45) Date of Patent: Jan. 13, 2004

(54) FERROELECTRIC LIQUID CRYSTAL PANEL

(75) Inventors: Suk-Won Choi, Anyang-shi (KR); Hyung-Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 406 days.

(21) Appl. No.: 09/739,660

(22) Filed: Dec. 20, 2000

(65) Prior Publication Data

US 2001/0022641 A1 Sep. 20, 2001

(30) Foreign Application Priority Data

Dec. 20, 1999 (KR) .............................. 11-59463

(51) Int. Cl.[7] ................................ G02F 1/13
(52) U.S. Cl. ...................... 349/172; 349/88; 349/94
(58) Field of Search ..................... 349/80, 88, 86, 349/92, 93, 94, 172, 201

(56) References Cited

U.S. PATENT DOCUMENTS 5,262,882 A * 11/1993 Hikmet ..................... 349/127
5,504,600 A * 4/1996 Pirs et al. .................. 349/89
5,948,486 A * 9/1999 Sage et al. ................. 428/1.1
6,133,975 A * 10/2000 Li et al. .................... 349/134
6,304,312 B1 * 10/2001 Tanabe et al. .............. 349/201

\* cited by examiner

*Primary Examiner*—James Dudek
(74) *Attorney, Agent, or Firm*—McKenna Long & Aldridge LLP (57) ABSTRACT

A liquid crystal display panel including first and second substrates, and a FLC layer interposed therebetween. A small quantity of additives are mixed in the FLC layer, without changing the electrical or chemical properties of the FLC. Under a proper temperature and an electric field, the FLC layer is ripened sufficiently. Thereafter, the FLC is exposed to light such that polymer networks are formed in the FLC layer due to the polymerization by the additives. The polymer networks connect with each other across molecular layers in the FLC such that the molecules of the FLC are stabilized in proper orientations and maintain their molecular layer structure regardless of the temperature variance. And, the diffraction grating becomes stable regardless of the temperature variance, and fast response time and good gray scale are achieved.

14 Claims, 9 Drawing Sheets

FERROELECTRIC LIQUID CRYSTAL PANEL

This application claims the benefit of Korean Patent Application No. 1999-0059463, filed on Dec. 20, 1999, which is hereby incorporated by reference for all purposes as if fully set forth herein.

BACKGROUND OF THE INVENTION

1. Field of the Invention

The present invention relates to liquid crystal panels for liquid crystal display (LCD) devices. More particularly, the present invention relates to a liquid crystal panel that uses a ferroelectric liquid crystal.

2. Discussion of the Related Art

A conventional liquid crystal display (LCD) includes a display panel. A display panel typically has upper and lower substrates that are attached with each other, and an interposed liquid crystal, usually a nematic, a smetic, or a cholesteric liquid crystal. A liquid crystal display device utilizes the electro-optic effects of the liquid crystal. A display panel is operationally divided into a plurality of liquid crystal cells. On the exterior surfaces of the upper and lower substrates, polarizers or retardation films are selectively attached.

A major design consideration of a liquid crystal cell is the characteristics of the particular liquid crystal that is used. A good liquid crystal should have a fast response time, a good gray scale, and a wide viewing angle, all while operating at a low driving voltage. However, it is very difficult to find a liquid crystal that has all of those characteristics. Thus, various designs have been adopted for liquid crystal display devices.

Among the various types of liquid crystals, a low twisted nematic (LTN) liquid crystal has advantages of a short response time and a good gray scale. However, it typically has low contrast ratios and relatively poor color-dispersion properties. Other twisted nematic (TN) liquid crystals have higher twist angles (such as 90 degrees) or employing an in-plane switching (IPS) mode. While those liquid crystals can provide a wide viewing angle, afterimages are produced when displaying moving images, and their brightness is relatively low. The anti-ferroelectric liquid crystal (AFLC), or the optically compensated birefringence (OCB), have advantages of a wide viewing angle and a fast response time, although there are problems with contrast ratios and cell gap control.

Figure 1:
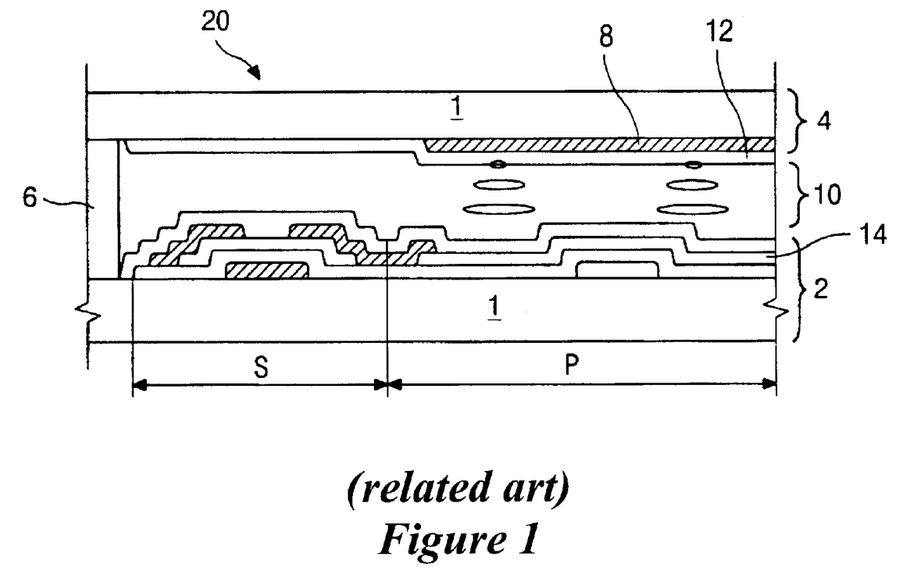
FIG. 1 is a cross-sectional view of a typical TFT liquid crystal display panel.

FIG. 1 is a cross-sectional view illustrating a conventional TN-LCD panel 20. As shown in FIG. 1, the TN-LCD panel has lower and upper substrates 2 and 4 and an interposed liquid crystal layer 10. The lower substrate 2 includes a substrate 1 having a TFT "S" that is used as a switching element to change the orientation of the liquid crystal molecules. The TFT "S" includes a pixel electrode 14 that applies a voltage to the liquid crystal layer 10 in accordance with signals that are applied to the TFT "S". The upper substrate 4 has a color filter 8 for implementing color, and a common electrode 12 on the color filter 8. The common electrode 12 serves as an electrode for applying a voltage to the liquid crystal layer 10. The pixel electrode 14 is arranged over a pixel portion "P," i.e., a display area. Further, to prevent leakage of the liquid crystal layer 10 between the substrates 2 and 4, those substrates are sealed by a sealant 6.

Figure 2A:
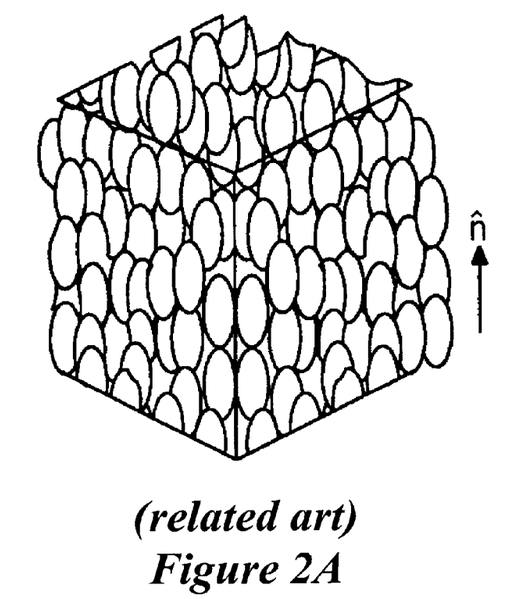
FIGS. 2A, 2B, and 2C illustrate molecular alignments of nematic, smetic, and cholesteric liquid crystals, respectively.
Figure 2B:
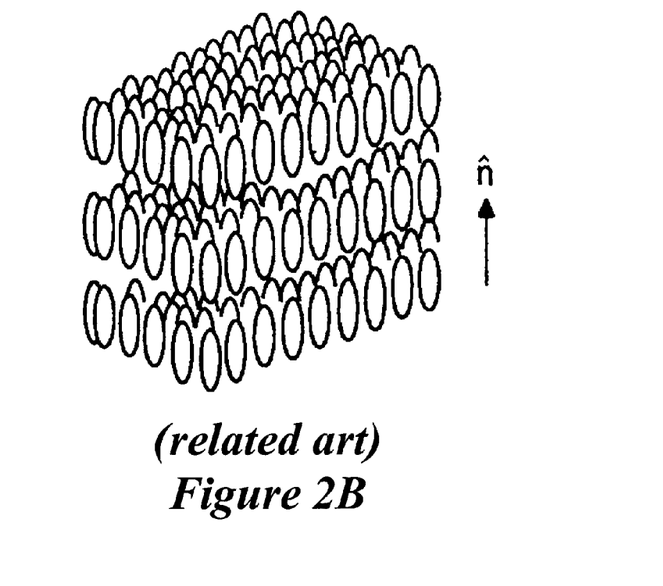
Figure 2C:
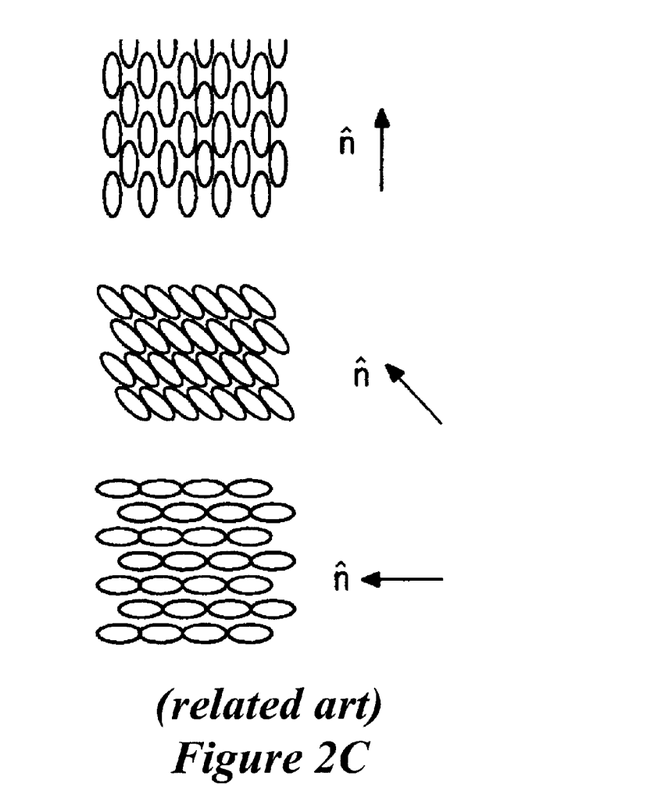

FIGS. 2A to 2C illustrate various alignments of possible liquid crystal molecules in the liquid crystal layer. As shown in FIG. 2A, in the nematic liquid crystal, each rod-like molecule fluctuates quite rapidly, but the molecules have a definite orientational order expressed by a unit vector "ñ" called a director. As shown in FIG. 2B, in the smetic liquid crystal the molecules have a layered structure in which the molecular orientation is perpendicular or nearly perpendicular to the layers. As shown in FIG. 2C, in the cholesteric liquid crystal, the director ñ changes its orientation gradually along a helical axis. The helical axis coincides with the optical axis of this material. Among the three different types of liquid crystals, the nematic liquid crystal is most widely used in liquid crystal display devices.

Liquid crystals for liquid crystal display devices should:
a) have a liquid crystal phase that extends from low to high temperatures, and thus are operable over a range of temperatures;
b) be chemically and optically stable over time;
c) have a low viscosity and a fast response time;
d) have highly ordered molecular alignments and thus provide a good contrast; and
e) have a large dielectric anisotropy and a low operating voltage.

The electro-optic effect enables electrical modulation of light by changing the alignment of the liquid crystal molecules using an applied electric field.

Among the various types of nematic liquid crystals, a twisted nematic (TN) liquid crystal and a super twisted nematic (STN) liquid crystal are often used. For a TN liquid crystal panel, a nematic liquid crystal is interposed between transparent lower and upper electrodes (reference the common electrode 12 and the pixel electrode 14 of FIG. 1). Those electrodes induce a definite molecular arrangement such that a gradual rotation of the molecules occurs between the lower transparent electrode and the upper transparent electrode until a twist angle of 90 degrees is achieved. In an STN liquid crystal panel the angle of twist rotation is increased to 180 to 360 degrees.

Figure 3A:
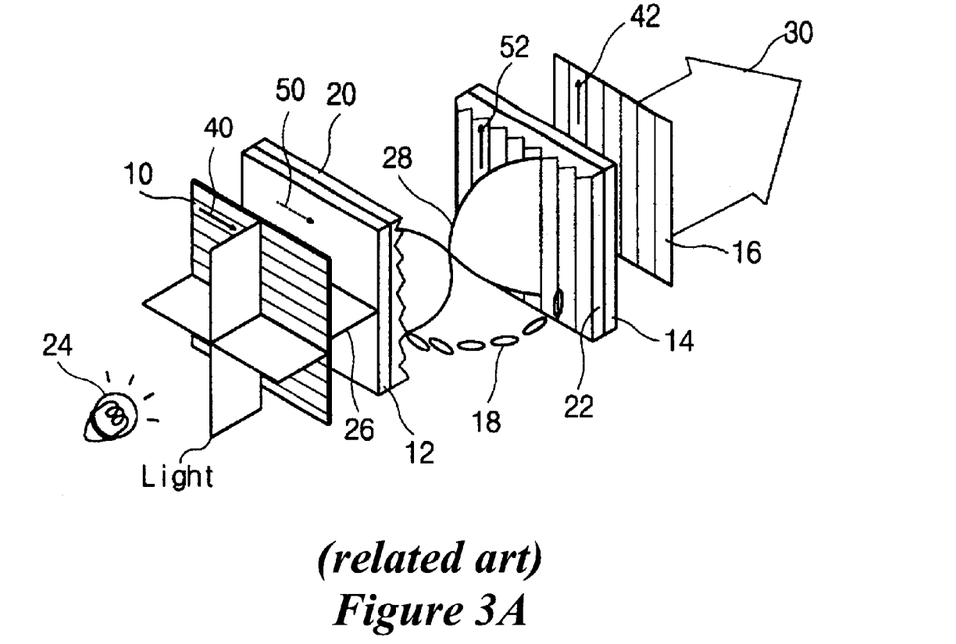
FIGS. 3A and 3B illustrate a configuration and an operation of a liquid crystal panel.

The basic configuration and operation of a twisted nematic liquid crystal display device will now be explained. As shown in FIG. 3A, opposed and spaced apart first and second polarizers 10 and 16, respectively, have perpendicular first and second transmittance axis directions 40 and 42. Between the two polarizers 10 and 16 are first and second transparent substrates 12 and 14, which are also opposed to and spaced apart from each other. Spacers are used to maintain the cell gap between the substrates. For example, plastic balls or silica balls having a diameter of 4 to 5 micrometers can be sprayed on the first substrate.

Still referring to FIG. 3A, the first and the second transparent substrates 12 and 14 include first and second orientation films 20 and 22, respectively, on their opposing surfaces. Between the first and second orientation films 20 and 22 is a positive TN liquid crystal 18.

The positive TN liquid crystal 18 has a characteristic that it arranges according to an applied electric field. The first and second polarizer 10 and 16, respectively, transmit light that is parallel with their transmittance-axis directions 40 and 42, but reflect or absorb light that is perpendicular to their transmittance-axis directions 40 and 42.

The first and second orientation films 20 and 22 were previously rubbed in a proper direction with a fabric. This rubbing causes the positive TN liquid crystal molecules between the first and second transparent substrates 12 and 14 to become tilted several degrees. First and second rubbing directions 50 and 52 of the first and second orientation films 20 and 22 are, respectively, parallel with the transmittance-axis directions of the first and second polarizers 10 and 16.

With no electric field applied across the positive TN liquid crystal 18, the orientation of the liquid crystal molecules twists between one substrate to the other at a definite angle, that angle being the twisted angle of the positive TN liquid crystal 18.

During operation, a back light device 24 irradiates white light onto the first polarizer 10. The first polarizer 10 transmits only the portion of the light that is parallel with the first transmittance-axis direction 40. The result is a first linearly polarized light 26 that passes through the polarizer 10. The first linearly polarized light 26 then passes through the positive TN liquid crystal 18 via the first transparent substrate 12.

As the first polarized light 26 passes through the positive TN liquid crystal 18, the first polarized light 26 changes its phase according to the twisted alignment of the positive TN liquid crystal molecules. Accordingly, the first linearly polarized light 26 becomes an elliptically (possibly circularly) polarized light 28.

The elliptically polarized light 28 passes through the second transparent substrate 14, and meets the second polarizer 16. When the elliptically polarized light 28 passes through the second polarizer 16, the second polarizer 16 transmits only the portion of the elliptically polarized light 28 that is parallel to the second transmittance-axis direction 42. A polarized light 30 is then emitted. In the above-mentioned operation, a white state is displayed.

Figure 3B:
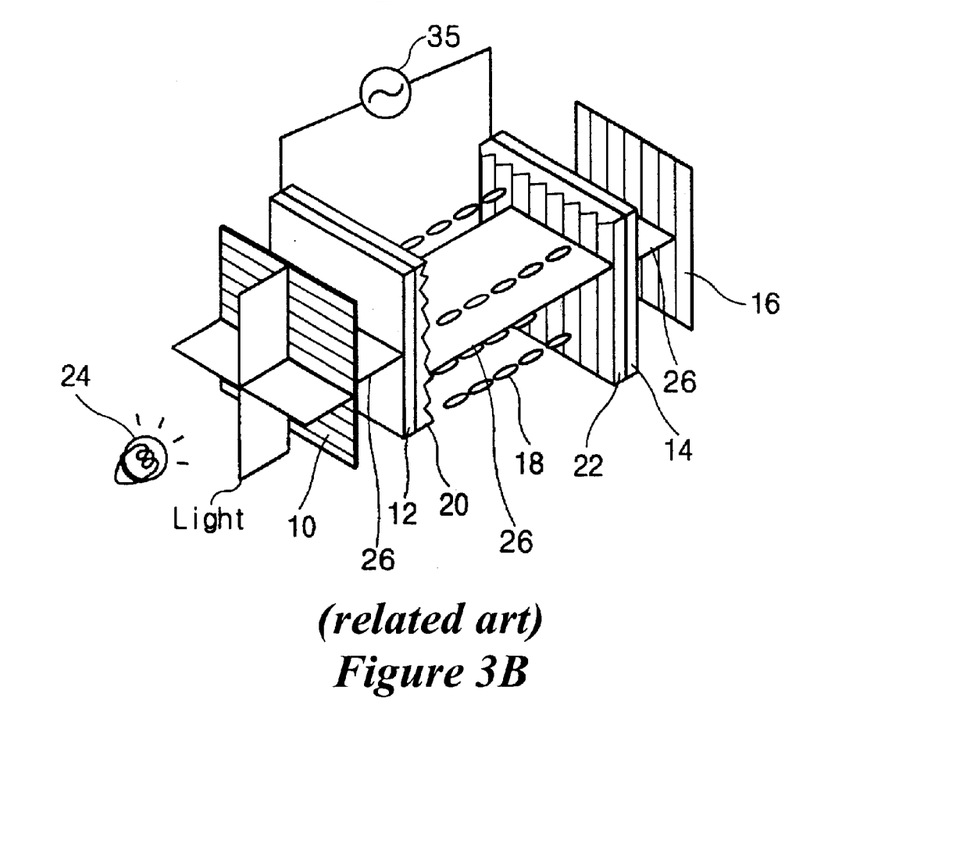

Turning now to FIG. 3B, when a voltage supplier 35 induces an electric field through the positive TN liquid crystal 18, the positive TN liquid crystal molecules rotate and arrange such that the longitudinal axes of the molecules are perpendicular to the surfaces of the first and second substrates 12 and 14. Accordingly, the first linearly polarized light 26 passes through the first transparent substrate 12, the positive TN liquid crystal 18, and the second transparent substrate 14 without phase change. The first linearly polarized light 26 then meets the second polarizer 16. As the second polarizer 16 has the second transmittance-axis direction 52 which is perpendicular to the first linearly polarized light 26, the second polarizer 16 absorbs or shields most of the first linearly polarized light 26. Thus, little or none of the first linearly polarized light 26 passes through the second polarizer 16. Accordingly, a dark state is displayed.

Recently, a liquid crystal projector that uses the above-mentioned TN liquid crystal panel has been developed, although research continues. The liquid crystal projector displays images for many users in a theater or in a meeting room. In that liquid crystal projector, transmissive liquid crystal panels having TFTs are used as light valves.

Figure 4:
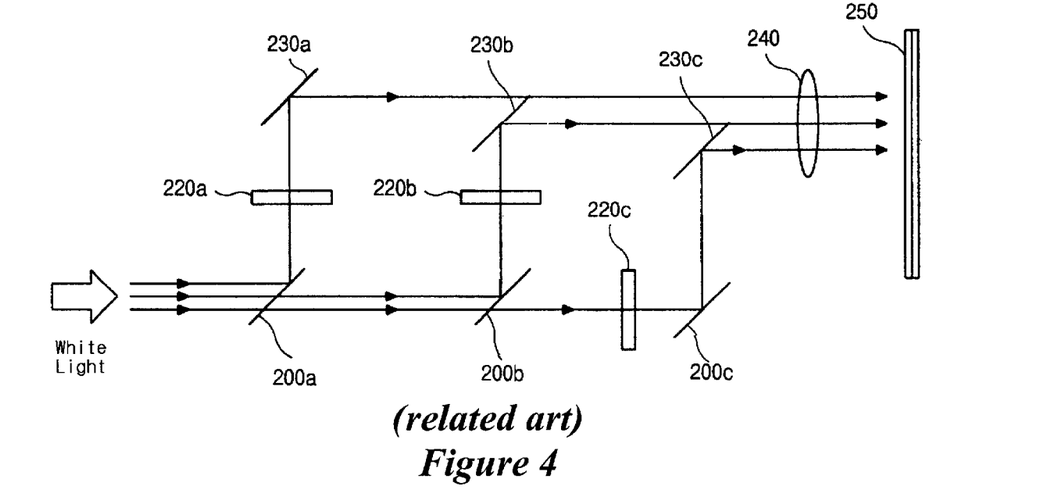
FIG. 4 schematically illustrates a liquid crystal projector.

Referring to FIG. 4, the liquid crystal projector includes red, green, and blue dichroic mirrors 200a, 200b, and 200c; red, green, and blue liquid crystal panels 220a, 220b, and 220c; and a lens 240 that concentrates and focuses light from the liquid crystal panels onto an image screen 250 that displays images.

In operation, a light source (not shown in FIG. 4, but see FIG. 12) irradiates white light onto the red dichroic mirror 200a. That mirror reflects the red portion of the white light to the red liquid crystal panel 220a. The green and blue portions of the white light pass through the red dichroic mirror 200a to the green dichroic mirror 200b. The green dichroic mirror 200b reflects the green portion of the white light onto the green liquid crystal panel 220b. The blue portion of the white light is directed onto the blue liquid crystal panel 220c. The red light from the red liquid crystal panel 220a is reflected by a first total reflection prism 230a into the lens 240. The green light from the green liquid crystal panel 220b is reflected by a second total reflection prism 230b into the lens 240. The blue light from the blue liquid crystal panel 220c is reflected first by a blue dichroic mirror 200c, and then by a third total reflection prism 230c into the lens 240. The lens 240 then concentrates and focuses its received light onto the image screen 250 to display a composite color image.

Figure 5A:
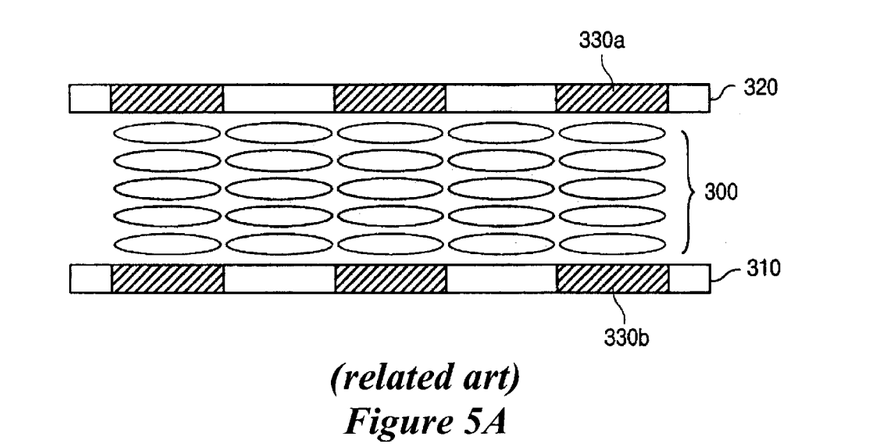
FIGS. 5A and 5B illustrate the operation of a light valve.
Figure 5B:
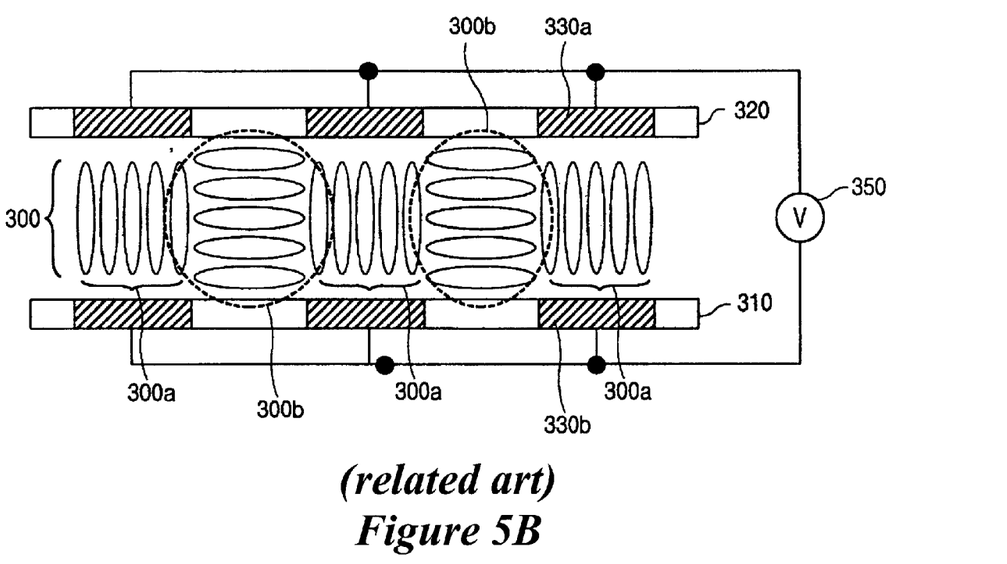

FIGS. 5A and 5B illustrate the operation of a light valve. As shown, first and second substrates 310 and 320 having first and second patterned electrodes 330a and 330b are spaced apart from each other, and a liquid crystal 300 is interposed therebetween. When no electric field is induced by the first and the second patterned electrodes 330a and 330b, as shown in FIG. 5A, the liquid crystal 300 maintains its first ordered molecular alignment wherein the liquid crystal molecules are parallel with the substrates.

However, as shown in FIG. 5B, when an electric field is induced between the first and the second patterned electrodes 330a and 330b by a voltage source 350, first portions 300a of the liquid crystal 300 between the first and second patterned electrodes 330a and 330b realign such that the liquid crystal molecules of the first portions are perpendicular to the substrates. In second portions 300b adjacent the first portions 300a the liquid crystal molecule maintain the first ordered molecular alignment. Therefore, under the influence of the electric field, the first and the second portions 300a and 300b of the liquid crystal 300 attain different alignments. Such alignments have different refractive indexes. Thus, the transmission of incident light through the light valve can be controlled according to differences in the refractive indexes of the first and second portions of the liquid crystal.

The liquid crystal beneficially has a fast response time to enable the processing of a large quantity of image data, especially that of moving images. However, in the nematic or the cholesteric liquid crystal, the time required for the molecules to realigned under the influence of the electric field are too long, and consequently the response time of the liquid crystal is not fast enough for many applications.

Because of such limitation, a ferroelectric liquid crystal (FLC) in the smetic phase has become of interest. The FLC has a hundred times faster response time than the TN LC or the STN LC. This is because the FLC has a spontaneous polarization and a bistability that leads to high-speed responses, and thus an improvement in the imaging of moving images. The high speed response of the FLC also improves the operation of a mouse used as an input device in computers, and the operation of window operating systems.

Figure 6:
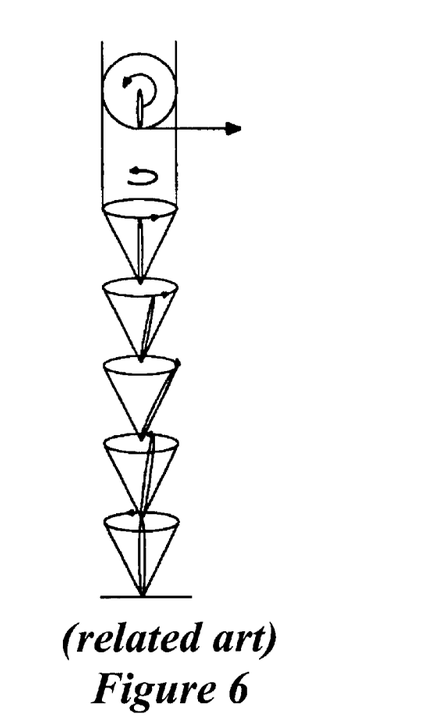
FIG. 6 shows molecular alignments of the FLC.

FIG. 6 shows molecular alignments of the FLC. As shown, the longitudinal axes of the liquid crystal molecules gradually align along a helical structure.

Figure 7:
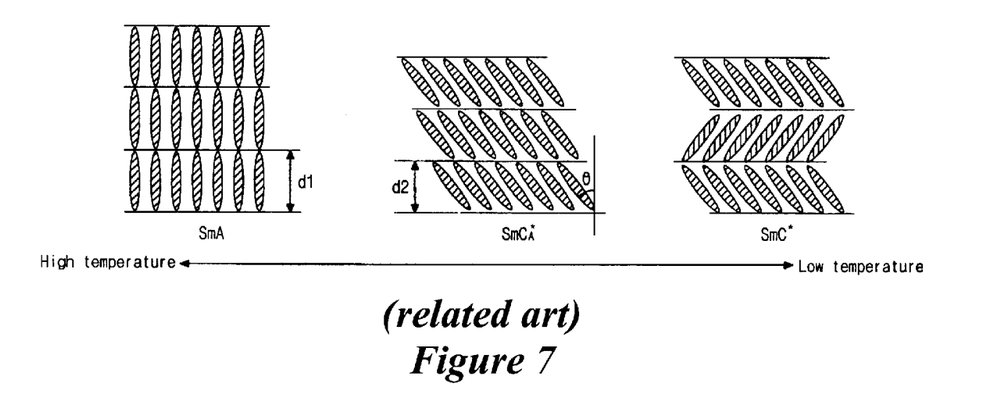
FIG. 7 shows phase changes of the FLC according to various temperatures.

To adapt the ferroelectric LC for liquid crystal display applications, the cell gap between the two transparent substrates of a liquid crystal display device should be uniformly maintained at less than about 2 micrometers. However, as shown in FIG. 7, a ferroelectric LC changes phase according to temperature. When compared with a smetic A (SmA) phase at high temperature, lower temperature phases smetic $C_A^*$ ($SmC_A^*$) and smetic $C^*$ ($SmC^*$) have the longitudinal axes of their molecules tilted at a tilt angle "θ" with respect to a line that is perpendicular to the substrates (not shown).

Therefore, the molecular layer thickness "d2" of the smetic $C_A^*$ ($SmC_A^*$) phase or the smetic $C^*$ ($Sm_C^*$) phase is less than the molecular layer thickness "d1" of the SmA phase. These thickness differences between the phases of a ferroelectric LC cause difficulty in maintaining a uniform layer spacing.

Further, since the molecular layers of the SmA phase are more ordered than those of the Sm $C_A^*$ phase or of the SmC* phase, the molecules of the SmA phase are relatively easily aligned with an aligning treatment. Therefore, to control the early state of the molecular alignment in the Sm $C_A^*$ or SmC* phase, the molecules are conventionally aligned in the SmA phase.

However, after the molecules are aligned in the SmA phase, as the phase of the FLC changes to the $SmC_A^*$ phase or to the SmC* phase, the molecular alignments become more disordered due to the molecular layer thickness (d1, d2) difference between the phases. That is to say, as the phase changes from the SmA to the $SmC_A^*$ or SmC* phase, the molecules tilt to a definite angle, and the molecular layers space with gaps between themselves such that the molecular alignments are disordered. Additionally, the high temperature SmA phase has a lower transmittance than the lower temperature $SmC_A^*$ and SmC* phase. A lower transmittance results in a low luminance of the liquid crystal display panel.

SUMMARY OF THE INVENTION

Accordingly, the principles of the present invention relate to liquid crystal panels that are designed to substantially obviate one or more of the problems due to the limitations and disadvantages of the related art.

It is an object of the present invention to provide a liquid crystal display panel having a fast response time.

It is another object of the present invention to provide a method for fabricating diffraction gratings having a fast response time.

It is another object of the present invention to provide a liquid crystal projector that uses a ferroelectric liquid crystal, beneficially one having reduced temperature dependence.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

The principles of the present invention provide for a method of fabricating a liquid crystal display device. Those principles include forming a first orientation film on a first substrate, forming a second orientation film on a second substrate, spacing the first and second substrates apart, and interposing a ferroelectric liquid crystal layer between the first and second substrates. The ferroelectric liquid crystal layer includes additives. Beneficially, the ferroelectric liquid crystal layer is aligned by inducing a direct electric field to the ferroelectric liquid crystal layer over and around a phase transition temperature of a SmC* phase. The additives form polymer networks, beneficially after exposing the ferroelectric liquid crystal layer to light.

In an embodiment of the present invention the additives include a monoacrylate compound and/or a diacrylate compound. Ultraviolet light is a particularly useful way to form the polymer networks.

The principles of the present invention also provide for a method of fabricating a diffraction grating of the types used liquid crystal cells. Such a method includes locating a ferroelectric liquid crystal layer having additives between first and second substrates. Then, forming a plurality of first and second grating portions in the liquid crystal cell and then applying a first electric field to the first grating portions at a temperature near a phase transition temperature of a SmC* phase. The first grating portion is then exposed to light using a mask such that the ferroelectric liquid crystal layer is stabilized. A second electric field is then applied to the second grating portions at a temperature near a phase transition temperature of the SmC* phase. The second grating portions are then exposed to light using a mask such that the ferroelectric liquid crystal layer is stabilized. Beneficially, the additive includes a monoacrylate compound and/or a diacrylate compound. Furthermore, the alignment direction of the ferroelectric liquid crystal layer in the first grating portion is opposite to the alignment direction of the ferroelectric liquid crystal layer in the second grating portion. Beneficially, the first electric field is opposite to the second electric field. Additionally, using ultraviolet light to expose the grating portions is particularly useful.

The principles of the present invention also provide for a liquid crystal projector for producing an image on an imaging screen. That projector includes a light source, a plurality of light valves, and a focusing lens for collimating and focusing light from the light valves. Each light valve includes first and second substrates and a ferroelectric liquid crystal layer between those substrates. Each ferroelectric liquid crystal layer is divided into first and second portions that have different alignment orientations. First and second transparent conductive layers are located on the first and second substrates.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF AN ILLUSTRATED EMBODIMENT

Reference will now be made in detail to an embodiment of the present invention, an example of which is illustrated in the accompanying drawings.

Figure 8A:
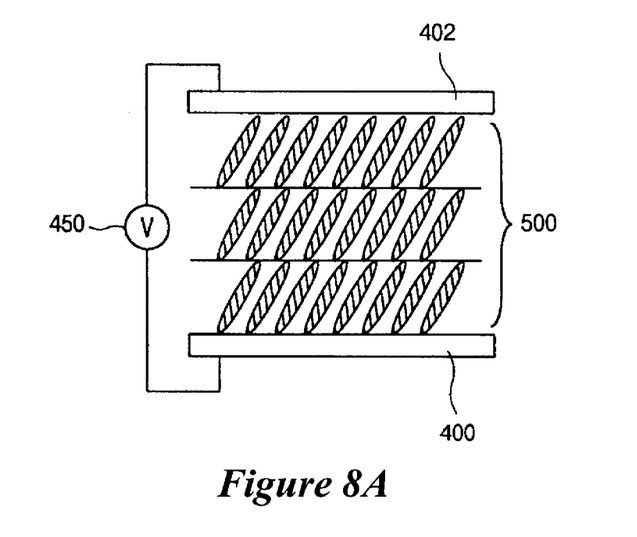
FIGS. 8A and 8B show a method of aligning the FLC according to an embodiment of the present invention.
Figure 8B:
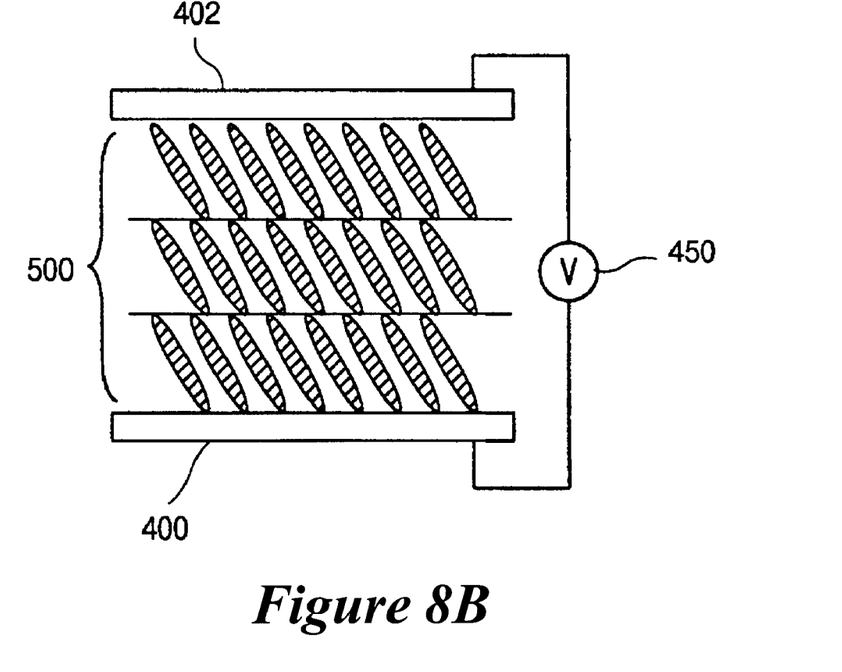
Figure 11:
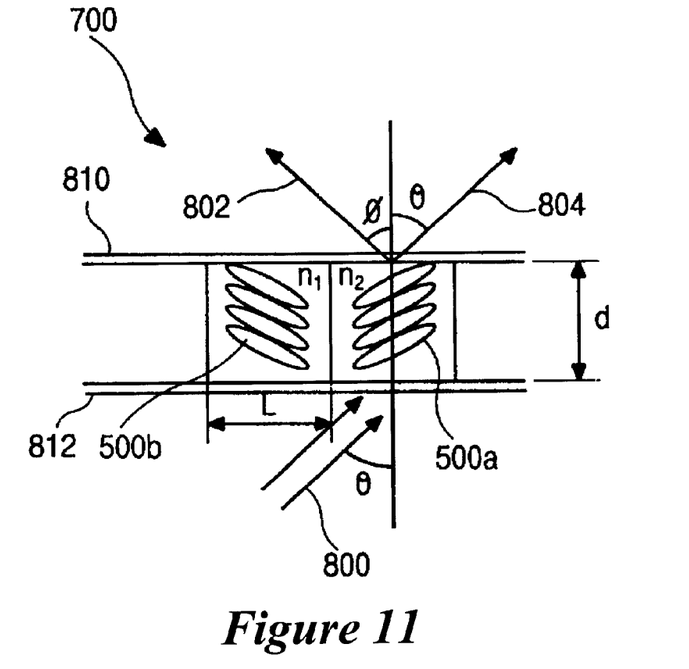
FIG. 11 illustrates the operation of the diffraction grating shown in FIG. 10B.

FIGS. 8A, 8B, and 11 help illustrate a method of fabricating a liquid crystal panel according to the principles of the present invention.

As shown in FIGS. 8A and 8B, a FLC 500 is interposed between first and second substrates 400 and 402. A voltage source 450 applies an electric field to the FLC via electrodes (not shown) on the first and second substrates. The FLC 500 is mixed with a polymerizing additive or additives. Beneficially, that additive includes a monoacrylate compound and/or a diacrylate compound that can be light polymerized. The first and second substrates are preferably comprised of a transparent material such as a glass.

Though not shown in FIGS. 8A, 8B, and 11, but as shown FIGS. 3A and 3B, on opposing surfaces of the first and second substrates are first and second orientation films. Those films beneficially have first and second rubbing directions, respectively.

Figure 10A:
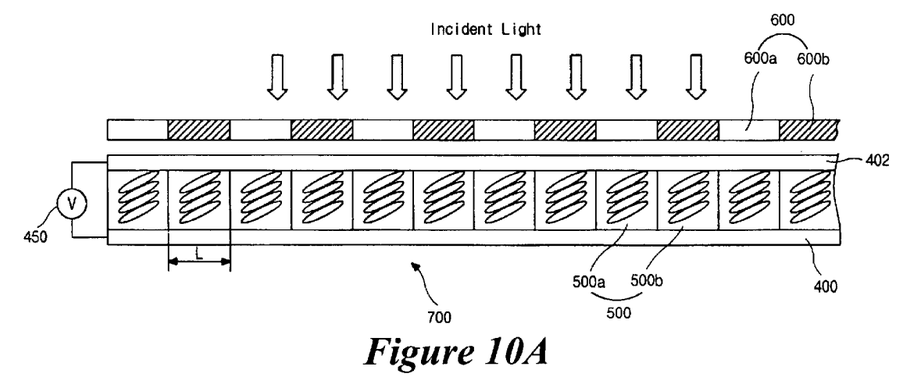
FIGS. 10A and 10B illustrate a forming of a diffraction grating according to an embodiment of the present invention.
Figure 10B:
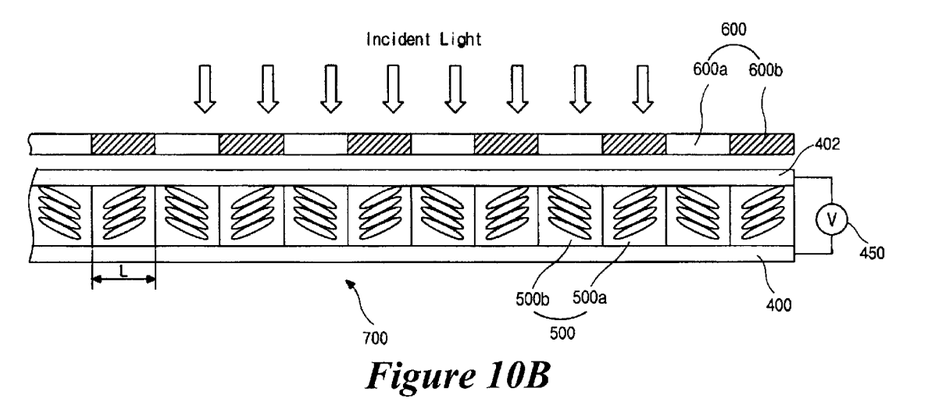

The voltage source 450 induces the electric field to the FLC 500 when the temperature of the FLC is below the phase transition from the SmA phase to the SmC* phase. Under such conditions, the liquid crystal molecules of the FLC 500 are tilted to a definite angle relative to the normal direction of the layer. Before the electric field is applied, since the temperature is over the phase transition point of the SmC* phase, the liquid crystal molecules were substantially aligned in the SmC phase as shown in FIG. 7. The electric field of FIG. 8B is opposite that in FIG. 8A. The result is that the liquid crystal molecules of FIG. 8B are tilted in an opposite direction FIGS. 10A and 10B illustrate the liquid crystal cell described above adapted for use in a light valve diffraction grating 700 of the type used in a liquid crystal projector. As shown, in the diffraction grating 700 the FLC 500 is interposed between the first and second substrates 400 and 402. Above the second substrate 402 is a mask 600 having transparent portions 600a and opaque portions 600b. The transparent portions 600a transmit almost all incident light, while the opaque portion 600b reflects or absorbs almost all incident light. The FLC 500 is mixed with an additive, beneficially an additive as mentioned above. First and second grating portions 500a and 500b within the FLC respectively correspond to the transparent and opaque portions 600a and 600b of the mask 600. Each of the first and second portions 500a and 500b of the FLC 500 beneficially has a width of "L."

Similar to FIG. 8A, a voltage source 450 applies an electric field to the FLC 500 when the temperature is over the phase transition temperature of the SmC* phase.

Under the incident light, only the transparent portions 600a of the mask 600 transmit light. That transmitted light is applied to the first grating portions 500a of the FLC 500. The opaque portions 600b of the mask 600 shield the second grating portion 500b of the FLC 500 from the incident light.

Figure 9:
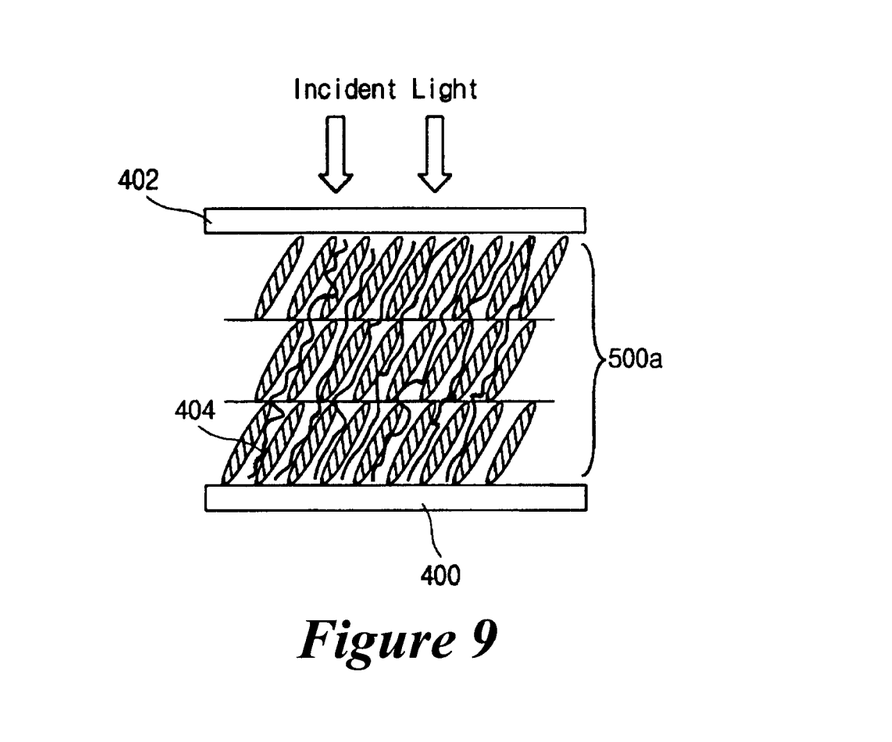
FIG. 9 illustrates a polymer network formed by light.

The additives in the first grating portions 500a of the FLC are polymerized by the incident light. This is illustrated in FIG. 9, which shows polymer networks 404 being formed in a first grating portion 500a. After the polymer networks 404 are formed, the incident light and the electric field are stopped. The liquid crystal layers of the first grating portions are then formed according the electric field. That is, the additives form polymer networks 404 that are aligned along the alignment directions of the liquid crystal layer when that layer is under the influence of the electric field.

Turning now to FIG. 10B, the mask 600 is then moved parallel to the substrates such that the transparent portions 600a of the mask 600 align with the second grating portions 500b of the FLC 500. The voltage source 450 then induces an opposite electric field across the FLC 500. Incident light then forms polymer networks from the additives added to the FLC in the second grating portions 500b. Those polymer networks stabilize opposite to the first grating portion 500a. At this point, although the polymer networks in the first grating portion 500a are substantially stabilized, the opposite electric field could affect the molecular orientation of the first grating portion 500a. Therefore, as shown in FIG. 10B, the opaque portions 600b of the mask 600 beneficially shield the first grating portions 500a when light is applied to the second grating portions.

Through the above-mentioned fabricating method, the first and second grating portions 500a and 500b are stabilized in opposite orientations. The result is a diffraction grating 700 that is in accord with the principles of the present invention. Due to the polymer networks, that diffraction grating tends to maintain its FLC molecular layer structure regardless of temperature.

With reference to FIG. 11, the operation of the diffraction grating 700 will now be explained. As shown, incident light 800 having an incidence angle of "θ" is applied to the FLC layer 500 of the diffraction grating 700. The incident light 800 is then divided into a diffracted light 802 having a diffraction angle of "φ" and a transmitted light 804 having the same transmittance angle of "θ" as the incidence angle. The incident, diffracted, and transmitted light 800, 802, and 804 respectively have first, second, and third brightness "$I_m$", "$I_d$", and "$I_t$". The FLC layer 500 has a molecular layer thickness of "d", and the first and second grating portions 500a and 500b respectively have first and second refractive indexes "$n_1$" and "$n_2$". Furthermore, each of the first and second grating portions 500a and 500b of the FLC layer 500 has a width of "L."

The second brightness $I_d$ (of the diffracted light 802) depends on the incidence angle θ, the molecular layer thickness d, the width L, the first and second refractive indexes $n_1$ and $n_2$, and the diffraction angle φ. Furthermore, since the first and second refractive indexes $n_1$ and $n_2$ vary according to the electric field applied to the FLC layer, the second brightness $I_d$ of the diffracted light 802 can be controlled by that electric field.

Figure 12:
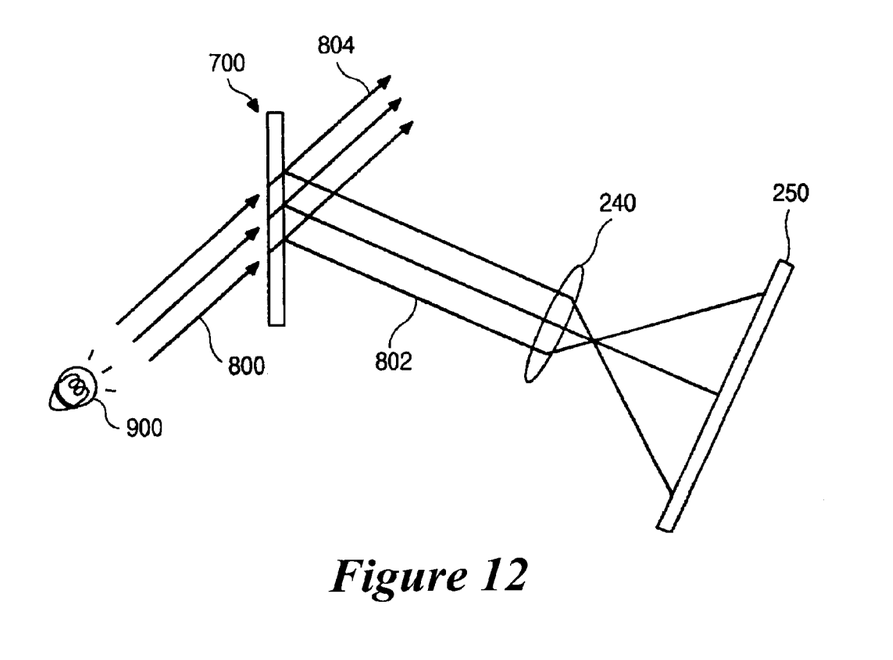
FIG. 12 illustrates a liquid crystal projector according to an embodiment of the present invention.

FIG. 12 illustrates the operation of a liquid crystal projector that is in accord with the principles of the present invention. As shown, spaced apart at a proper angle and distance from the diffraction grating 700 is a focusing lens 240. The lens 240 directs light onto an image screen 250. As the incident light 800 from a light source 900 passes through the diffraction grating 700 at a proper incidence angle, the incident light 800 divides into the diffracted and transmitted light 802 and 804 in accord with the electric field applied to the FLC (not shown) of the diffraction grating 700.

The focusing lens 240 concentrates rays of the diffracted light 802 into focus on the image screen 250 such that images are displayed. As explained above with reference to FIG. 11, the brightness of the diffracted light 802 is controlled by the electric field induced in the FLC of the diffraction grating 700. That is to say, as the induced electric field varies, the brightness of the refracted light changes such that a gray scale rendering can be achieved.

The diffraction grating 700 of FIG. 12 includes not only the first and second substrates 400 and 402 (see, for example, FIG. 9), but in this case of acting has a light valve, the first and second substrate 400 and 402 include transparent conductive layers 810 and 812, respectively (see FIG. 11).

A diffraction grating according to the principles of the present invention uses the FLC to achieve high speed responses and a superior image quality, particularly when displaying moving images.

Further, using an FLC mixed with an additive, such as a monoacrylate and/or a diacrylate compound, to produce polymer networks enables a stable brightness regardless of the temperature. Beneficially, only a small quantity of the additive is mixed in the FLC. This prevents significant changes in the electrical and chemical properties of the FLC. It also allows the polymer networks to be formed using light to induce polymerization. The polymer networks connect with each other across the molecular layers in the FLC such that the molecules of the FLC are stabilized in a proper orientation and to maintain their molecular layer structure over temperature changes. Accordingly, the brightness of the diffraction grating is stabled with regards to temperature. Additionally, the polymer networks improve the ruggedness of the FLC layer by reducing damage caused by external impacts.

While the principles of the present invention has been illustrated and described with reference to an embodiment thereof, it will be understood by those skilled in the art that the changes in form and details may be made without departing from the spirit and scope of the invention. Thus, it is intended that the present invention covers the modifications and variations that come within the scope of the appended claims or their equivalents.

What is claimed is:

1. A method of fabricating a liquid crystal display device, comprising:

forming a first orientation film on a first substrate;

forming a second orientation film on a second substrate;

spacing the first and second substrates apart by a gap;

adding an additive to a ferroelectric liquid crystal;

inserting the ferroelectric liquid crystal with the additive in the gap;

aligning the ferroelectric liquid crystal by inducing an electric field across the ferroelectric liquid crystal over a phase transition temperature of a SmC* phase; and forming a plurality of first grating portions and a plurality of second crating portions, which includes forming polymer networks in the ferroelectric liquid by polymerizing the additive.

2. A method of fabricating a liquid crystal display device according to claim 1, wherein the additive includes a monoacrylate compound.

3. A method of fabricating a liquid crystal display device according to claim 1, wherein the additive includes a diacrylate compound.

4. A method of fabricating a liquid crystal display device according to claim 1, wherein the polymer networks are formed by exposing the ferroelectric liquid to light.

5. A method of fabricating a liquid crystal display device according to claim 1, wherein the exposing light is ultraviolet.

6. A method of fabricating a diffraction grating, comprising:

adding an additive to a ferroelectric liquid crystal;

inserting the ferroelectric liquid crystal having the additive between first and second substrates;

forming a plurality of first grating portions, which includes producing a plurality of first polymer networks in the ferroelectric liquid crystal by polymerizing the additive; and forming a plurality of second grating portions by, which includes producing a plurality of second polymer networks in the ferroelectric liquid crystal by polymerizing the additive.

7. A method of fabricating a diffraction grating according to claim 6, wherein the first grating portions are produced by:

illuminating first portions of the ferroelectric liquid crystal with light;

applying a first electric field having a first direction across the first portions; and maintaining the temperature of the ferroelectric liquid crystal above a phase transition temperature of a SmC* phase.

8. A method of fabricating a diffraction grating according to claim 7, wherein the first portions are illuminated through a mask.

9. A method of fabricating a diffraction grating according to claim 7, wherein the illuminating light is ultraviolet.

10. A method of fabricating a diffraction grating according to claim 6, wherein the additive includes a monoacrylate compound.

11. A method of fabricating a diffraction grating according to claim 6, wherein the additive includes a diacrylate compound.

12. A method of fabricating a diffraction grating according to claim 7, wherein the second grating portions are produced by:

illuminating second portions of the ferroelectric liquid crystal with light;

applying a second electric field having a second direction across the second portions; and maintaining the temperature of the ferro electric liquid crystal above a phase transition temperature of a SmC* phase.

13. A method of fabricating a diffraction grating according to claim 12, wherein second direction is opposite to the first direction.

14. A method of fabricating a diffraction grating according to claim 12, wherein an alignment direction of the ferroelectric liquid crystal layer in the first grating portions is opposite to an alignment direction of the ferroelectric liquid crystal layer in the second grating portions.

* * * * *